Figure 1:
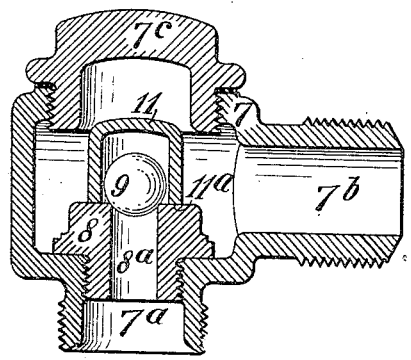

E. A. KELSEY.
CHECK VALVE.
APPLICATION FILED APR. 22, 1916.

1,199,569.

Patented Sept. 26, 1916.

Witnesses:
Fred. Roeger
Louise Keller

Edgar A Kelsey, Inventor

By Henry Schreiter his Attorney

UNITED STATES PATENT OFFICE.

EDGAR A. KELSEY, OF MOUNT VERNON, NEW YORK.

CHECK-VALVE.

1,199,569.      Specification of Letters Patent.      Patented Sept. 26, 1916.

Application filed April 22, 1916. Serial No. 92,999.

*To all whom it may concern:*

Be it known that I, EDGAR A. KELSEY, a citizen of the United States, and resident of Mount Vernon, county of Westchester, State of New York, have invented certain new and useful Improvements in Check-Valves, of which the following is a full, clear, and exact specification.

My invention relates to valves, its object is to provide a fluid-tightly closing check valve, composed wholly of metallic parts, and the invention consists of devising the herein shown and described construction of a valve, in which two sets of co-acting parts are employed, and thereby a double closing of the valve is effected.

The so-called "metal seated check valves" are known in the art, but it is also well known, that no maker of such valves will warrant it to be fluid-tight. Therefore, practically no metal seated check valves are available for use, and the check valves, most generally used in all devices where a fluid-tight closing is required, have the seat molded of rubber, compressed and indurated fiber, or of other variously compounded materials, or have a packing suitably affixed upon the seat. Neither of these substitutes for metallic valve parts endures for any reasonable time the conditions, and the wear, to which check valves are necessarily subjected, and, consequently, they are a source of troubles, and their parts, or even the entire valves, must be very frequently renewed.

A fluid-tightly closing check valve is essential not only in devices for feeding water into steam boilers, but also, practically in every other device, in which a check valve is used. It is well known in the art, that when the boiler check valve fails in its operation, or leaks, the pressure from the boiler is exerted upon the injector and prevents its proper working; the pressure from the boiler forcing steam and water back, through the overflow pipe of the injector, and there is not only the wasting of steam and water, but also the risk of serious accidents.

The construction of the improved valve, constituting the subject matter of my invention, is based on my discovery, that if in addition to the closing of the orifice in the valve seat by a ball, or plug, the top of the valve seat is smoothly finished, and a device, like the cup 7 is fitted thereon, a dependably fluid-tight closing of the valve is effected. It is not a mere duplication of the parts, for the seemingly curious fact was demonstrated by practical tests of my improved check valve, repeated many times under different conditions, that while neither the ball, nor the cup, when used alone, will produce an absolutely fluid-tight closing of the valve, this result is invariably effected when both the ball and the cup are used.

A valve, constructed according to my invention, is illustrated in the drawings hereto annexed and forming part of these specifications, wherein—

Figure 3:
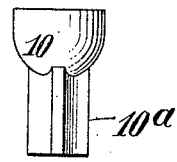
Figure 2:
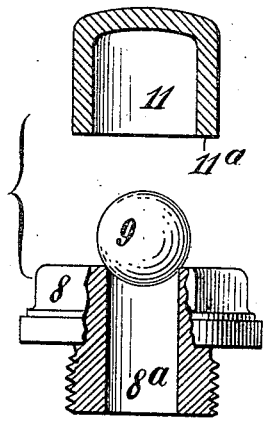
Figure 4:
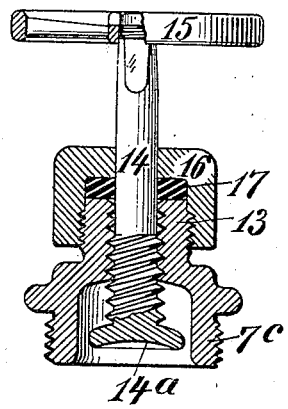

Figure 1 is a sectional view thereof; Fig. 2 a sectional view, partly elevation, on an enlarged scale, of the valve seat, of the ball for closing the orifice in the valve seat, and of the cup, employed as a supplementary closing device; Fig. 3 is an elevation of a modified form of the device for closing the orifice in the valve seat, and Fig. 4 a sectional view of a modified form of the hollow plug, closing the valve casing, with a screw-threaded spindle set therein, whereby the cup may be held immovably upon the valve seat.

The sectional view, shown in Fig. 1 of the drawing, represents what is known in the art as a "straight boiler check" attachment for boiler injectors; the casing 7 is angular, the branch $7^a$ being the inlet, and the branch $7^b$ the outlet therefrom. The opening, closed by the plug $7^c$ is made to provide a convenient access to the interior for setting the valve parts in their place.

The operating parts of the check valve comprise the valve seat 8, the ball 9 (or the semi-spherical plug 10) and the cup 11. These parts may be made of brass, bronze, steel, or any other suitable metal or metallic composition, capable of permanently withstanding the hard usage, and their capacity to effect a fluid-tight closing of the valve is not impaired by the heat and other severe conditions, to which check valves are subjected in their continuous use.

The structure, and the form of the valve seat 8, are shown in Fig. 2. Its externally screw-threaded stem is fitted into the correspondingly screw-threaded inlet $7^a$ of the valve casing; its head is hexagonal or square shaped, to enable it being gripped by a tool when screwing it in, in its place. The bore $8^a$ is drilled to make the inlet passage of the required diameter, and the bore is not machined, only the bur edge at the upper end is pressed by a spherically headed tool, to make the edge smooth and round. The top surface of the head of the valve seat 8 is turned flat and then ground on a steel plate to a smooth finish.

The ball 9 is produced and polished in the usual way as balls for ball-bearings are made. Its diameter is larger than the diameter of the bore $8^a$ in the valve seat. The seating of the ball 9 upon the aperture $8^a$ in the valve seat is illustrated in Fig. 2. Instead of the ball 9 a semi-spherical plug 10, shown in Fig. 3 may be used, which, however, needs to be provided with a skeleton stem $10^a$, as shown. The stem $10^a$ is loosely fitted into the bore $8^a$ and should be sufficiently long to maintain the plug in proper relative position upon the orifice of the valve seat.

The cup 11 is a hollow cylindrical piece closed on one end with a slightly convexed top. Its exterior diameter is less than the interior diameter of the hollow plug $7^c$ to enable the cup to freely enter the recess, when lifted from the valve seat by the pressure of the fluid forced into the casing through the bore in the valve seat. For the same purpose, the interior diameter of the cup 11 is slightly larger than the diameter of the ball 9, or of the plug 10. No part of the cup 11 need be machined, except the rim $11^a$, which, after being carefully turned at right angle to the axis of the cup, is ground on a steel plate to a smooth finish, the same way as the top surface of the valve seat 8, whereon the cup 11 sets.

The closing of the valve is effected by the ball 9, setting upon the edge of the bore $8^a$, and by the cup 11, setting on the flat top surface of the valve seat, and an absolutely fluid-tight closing is effected only when both closing devices are used. There is no difficulty experienced in using this doubly closing valve. Both of its co-acting parts operate effectively, the ball (or plug) acting as guide for the cup, and the cup assisting in maintaining the ball (or plug) in its operative position.

In some instances it is necessary, or advantageous, to use check valves, which may be operated also as stop valves. To meet this requirement, I have devised the modified form of the plug $7^c$, closing the opening in the casing 7, through which the valve parts are accessible. This modified form of the hollow plug, illustrated in Fig. 4, adds to the plug $7^c$ the boss 13, a screw-threaded bore therethrough, and a correspondingly screw-threaded spindle 14, screwed therein. The lower end $14^a$ of this spindle 14 is shaped, preferably as shown in the drawing, to fit the convexed top of the cup 11. The hand-wheel 15 set on the other end of the spindle 14, affords a hold for screwing the spindle in and out. To prevent leakage of the fluid along the spindle 14 the boss 13 is externally screw-threaded, and the stuffing box 16 is screwed thereon, compressing also the packing 17, snugly fitted upon the spindle 14. By screwing in the spindle 14 the cup 11 is held in upon the valve seat 8, closing the valve as a stop valve. When it is desired to have the valve operate again as a check valve, nothing further is necessary to be done beyond turning the spindle 14 to raise it from the cup.

I claim as my invention:

1. A valve, comprising a casing with an inlet into it, and an outlet therefrom; a perforated valve seat in the inlet of the casing and having its top surface evenly finished; a loose ball, larger than the perforation in the valve seat, and a cup loosely inclosing the ball and having its rim fitted upon the finished top surface of the valve seat; substantially as herein shown and described.

2. A valve, comprising a casing with an inlet into it, and an outlet therefrom; a perforated valve seat in the inlet of the casing and having its top surface evenly finished; a loose ball, larger than the perforation in the valve seat; a cup loosely inclosing the ball and having its rim fitted upon the finished top surface of the valve seat; a screw-threaded spindle operatably mounted in the casing in line with the cup, and means on the spindle for turning it; substantially as herein shown and described.

3. The combination with a perforated valve seat, having an evenly finished top surface, and with a loose ball, seated upon the perforation in the valve seat, of a cup, adapted to inclose the plug and having its rim fitted upon the finished top surface of the valve seat; substantially as herein shown and described.

4. The combination with a perforated valve seat, having an evenly finished top surface, and with a loose member having a substantially semi-spherical seating surface fitted upon the perforation in the valve seat, of a cup, adapted to inclose the loose member and having its rim fitted upon the finished top surface of the valve seat; substantially as herein shown and described.

EDGAR A. KELSEY.

Witnesses:
LYDIA A. JOST,
THEODORE A. JOST.